(12) United States Patent
Yasrebi et al.

(10) Patent No.: US 6,390,179 B1
(45) Date of Patent: May 21, 2002

(54) METHOD FOR PROCESSING MATERIALS TO INCREASE SLURRY LIFETIME

(75) Inventors: Mehrdad Yasrebi, Clackamas; Karl Milton Taft, III, Portland; David Howard Sturgis, Boring; Michael Gerald Sorbel, Oregon City; Mark E. Springgate, Portland, all of OR (US); Douglas Gene Nikolas, Battleground, WA (US)

(73) Assignee: PCC Structurals, Inc., Portland, OR (US)

( * ) Notice: Subject to any disclaimer, the term of this patent is extended or adjusted under 35 U.S.C. 154(b) by 0 days.

(21) Appl. No.: 09/710,545

(22) Filed: Nov. 8, 2000

(51) Int. Cl.[7] ............................ B22C 9/00; B22C 11/00; B28B 7/36; B28B 7/34

(52) U.S. Cl. ........................ 164/519; 164/15; 164/517; 106/38.27

(58) Field of Search ............................ 164/12, 15, 516, 164/517, 519, 165; 106/38.2, 38.27

(56) References Cited

U.S. PATENT DOCUMENTS

| | | | |
|---|---|---|---|
| 4,196,769 A | | 4/1980 | Feagin |
| 4,947,927 A | * | 8/1990 | Horton .................. 164/516 |
| 4,996,084 A | | 2/1991 | Elkachouty |
| 5,407,001 A | | 4/1995 | Yasrebi et al. |
| 5,535,811 A | | 7/1996 | Feagin |
| 5,624,604 A | * | 4/1997 | Yasrebi et al. .............. 106/461 |
| 5,630,465 A | | 5/1997 | Feagin |
| 5,643,844 A | | 7/1997 | Yasrebi et al. |
| 5,677,371 A | | 10/1997 | Guerra, Jr. |

* cited by examiner

Primary Examiner—M. Alexandra Elve
Assistant Examiner—Kevin McHenry
(74) Attorney, Agent, or Firm—Klarquist Sparkmann LLP

(57) ABSTRACT

Methods for increasing the lifetime of a casting slurry are described. One feature of the invention is processing refractory powders at a first hydration level to produce powders having a second, lower hydration level before the processed materials are used to form casting slurries. Processing according to the disclosed methods results in a substantial increase in the lifetime of a slurry made using such processed materials compared to slurries made using materials not processed as described herein. One embodiment of the method comprises heat processing at least one refractory powder, typically refractory powders which have undergone hydration subsequent to commercial production, for a period of time sufficient to reduce the amount of hydration from a first hydration level to a second hydration level. A slurry is formed using the refractory powder at an hydration level which provides an increased slurry lifetime relative to the same material without processing according to the method of the present invention. Slurry formation can be accomplished substantially immediately after processing, or up to about one week after processing, typically less than 24 hours after processing, and even more typically within 2 hours to about 8 hours after processing.

27 Claims, 7 Drawing Sheets

METHOD FOR PROCESSING MATERIALS TO INCREASE SLURRY LIFETIME

FIELD

This invention concerns casting slurries, particularly investment casting slurries, and a method for processing mold-forming materials to decrease slurry aging and increase slurry lifetime.

BACKGROUND

Investment casting is a process for making articles, referred to as castings, from metals and alloys. Castings are formed by pouring molten metals or alloys into molds having an internal cavity shaped in the form of a desired article. The metal or alloy is allowed to solidify inside the mold, and the mold is then separated from the casting. The mold is typically made from refractory materials, such as ceramics.

Investment casting molds can be formed by a dip coating-process in which wax or polymeric "patterns" formed in the shape of a desired article are dipped into a casting slurry. A casting slurry is a system in which small particles, such as small particles of refractory materials, are uniformly dispersed in a liquid. The liquid can be a variety of materials, such as water or an organic material, including but not limited to alcohols. The wet slurry material is allowed to at least partially dry to form a covering over the pattern. The pattern can be repetitively dipped to build up a coating of the desired thickness.

Aqueous slurries for processing ceramics are cheap and relatively environmentally safe. However, aqueous processing of some refractory materials, such as ceramics, is difficult because they dissolve in water. Organic-based slurries also have this problem because such slurries typically include water. It is believed that a common pathway for dissolution of ions from ceramics is the hydration of surface ions. "Hydration" means that the ceramic particles react with water to form a chemical bond. The compounds formed by hydration are referred to as hydrates. Surface ions adsorb water, react with the adsorbed water to form hydrates, and then dissolve.

Aging is defined as any change in slurry property versus time. Hydration of refractory powders results in slurry aging by, for example, increasing slurry viscosity. Aging can contribute to lower shell quality in many ways. For example, as ceramic materials dissolve, the dissolved species may substantially change the ionic strength of the solution and consequently agglomerate the particles. This can adversely affect mechanical properties of the constructed shell. Furthermore, if the charge of the species that dissolves is different from the charge of the ceramic particles or other components of the slurry (e.g., the ceramic particles have negative charge, but the dissolving species have positive charge or vice versa), then the dissolving species may preferentially adsorb onto different components of the slurry. This may change the rheological (the deformation and flow of matter) properties of the slurry, as well as other slurry properties of interest. Finally, as ceramic materials react with water, some ions may preferentially dissolve relative to others, which consequently changes the ratio of ions in suspension and solution. This may result in changes in the physical or chemical properties of the ceramic.

The dip-coating process generally requires using large volumes of slurries. It may take weeks or months before the whole quantity of slurry required for the dip-coating process is consumed. Unfortunately, slurry aging typically requires that the slurry be discarded well before it can be used to form casting molds. This is both costly and wasteful.

Powders are substantially free of surface hydroxides immediately after being manufactured at high temperatures. Slurry materials may be exposed to high temperatures during the initial manufacturing processes and during any subsequent fusion or sintering processes. Fusion and sintering are two methods of increasing the particle size of refractory powders. Fusion involves heating a powder above its melting point to produce a liquid. The liquid is cooled, re-crystallized and ground into a more desirable particle size distribution. Sintering involves fusion of fine particles upon heating at temperatures below the complete melting point of the powder. When sintering is completed, the sintered material is ground to a desirable powder size.

However, once the manufactured powders are exposed to ambient water in the atmosphere, hydration begins. Because refractory powders are manufactured in bulk and often are transported over long distances, it is not always practical or cost-efficient to either use or adequately seal the powders immediately after they are manufactured. Moreover, even if the powders are sealed at the factory sufficient to prevent hydration, which generally is not the case, a consumer who does not consume all of the powder once it is unsealed will have to store the unused portion. Unless the powders are (1) used immediately after they are manufactured, or (2) sealed in a water-free container immediately after they are manufactured and subsequently used immediately after unsealing, they will undergo surface hydration. In practice, neither 1 nor 2 are practicable; hence, refractory powders typically are used as hydrates to form casting slurries.

Hydration of refractory materials may be temporarily reduced by the consumer if the consumer undertakes further manufacturing of the powders, for example by sintering or fusing the powders, after they are received from the original manufacturer. However, the resulting powders immediately begin to rehydrate unless steps are taken to prevent hydration.

A number of solutions have been offered to control aging of investment casting slurries. Horton's U.S. Pat. No. 4,947,927 shows that increasing the pH to above 11 can reduce aging of yttria slurries. This is because yttria dissolution decreases with increasing pH. However, maintaining yttria slurry pH in a production environment above 11 at all times is inconvenient and impractical. Furthermore, compositions exhibit increased toxicity as the pH varies significantly from neutral.

Yasrebi et al.'s U.S. Pat. Nos. 5,407,001 and 5,643,844 teach decreasing the overall dissolution rate of an oxide by doping the oxide with a material having a lower solubility in the slurry medium, typically water, than the oxide. Consequently, slurry aging can be reduced. Coating powder surfaces with a protective layer also can reduce slurry aging. Yasrebi et al. in U.S. Pat. No. 5,624,604 show that adsorption of hydroxylated benzoic acid onto the surface of rare earth oxides reduces their dissolution rate and thereby reduces slurry aging.

Persons skilled in the art of ceramic processing have long sought simple and inexpensive method, to increase the lifetime of casting slurries. Despite the prior inventions directed to this objective, there still is a need for convenient and practical methods for increasing the useful lifetimes of investment casting slurries.

SUMMARY

This invention provides a method for increasing the lifetime of a casting slurry. One feature of the invention is processing slurry materials at a first hydration level to produce materials having a second, lower hydration level before they are incorporated into the slurry. This results in a substantial increase in the lifetime of a slurry made using such processed materials compared to slurries made using materials not processed as described herein.

One embodiment of the present method for increasing the lifetime of a casting slurry comprises heat processing at least one slurry material, typically refractory powders which have undergone hydration subsequent to commercial production, for a period of time sufficient to reduce the amount of hydration from a first hydration level to a second hydration level. A slurry is formed using the slurry material at a hydration level which provides an increased slurry lifetime relative to the same material without processing according to the method of the present invention. Slurry formation can be accomplished substantially immediately after processing, or up to about one week after processing, typically less than 24 hours after processing, and even more typically within 2 hours to about 8 hours after processing. If the material is stored under a substantially water-free atmosphere, then the materials can be used later.

The temperature and the time associated with processing the slurry material can be selected based on considering the extent to which slurry lifetime is increased. This can be measured using, for example, isoelectric points. One embodiment of the method comprises heating the slurry material, such as refractory powder, for a period of time sufficient to change the isoelectric point of the material from an initial pH to a second pH, such as where the initial and second isoelectric points differ by at least 0.5 pH unit, even more preferably by greater than at least 1.0 pH unit, and even more preferably by at least 1.5 pH units. Heat processing also can be done within particular temperature ranges, which is best determined with reference to particular materials. For yttria and alumina, working embodiments of the method have heated such materials at temperatures of from about 500° F. (260° C.) to about 2,400° F. (1,320° C.) for a period of time of from about 30 minutes to about 4 days, typically about 4 hours for working embodiments.

Working embodiments of the present method typically comprised providing at least one refractory powder selected from the group consisting of materials comprising yttria, zirconia, alumina, and mixtures thereof. "Materials comprising" indicates that such materials can include other materials, including materials designed to decrease slurry aging and increase slurry lifetime, such as co-fused materials, doped materials, etc. The refractory powder was heated as described above, the temperature and period of time being sufficient to reduce the first hydration level to a second hydration level as measured by isoelectric point in an aqueous medium. A slurry was formed using the processed powder within a time period after heating, the time period being chosen such that the lifetime of the slurry is extended by at least 10% or greater, and up to at least 300% or greater, of the lifetime of a slurry formed without processing the powder according to the method of the present invention.

DETAILED DESCRIPTION

Figure 1:
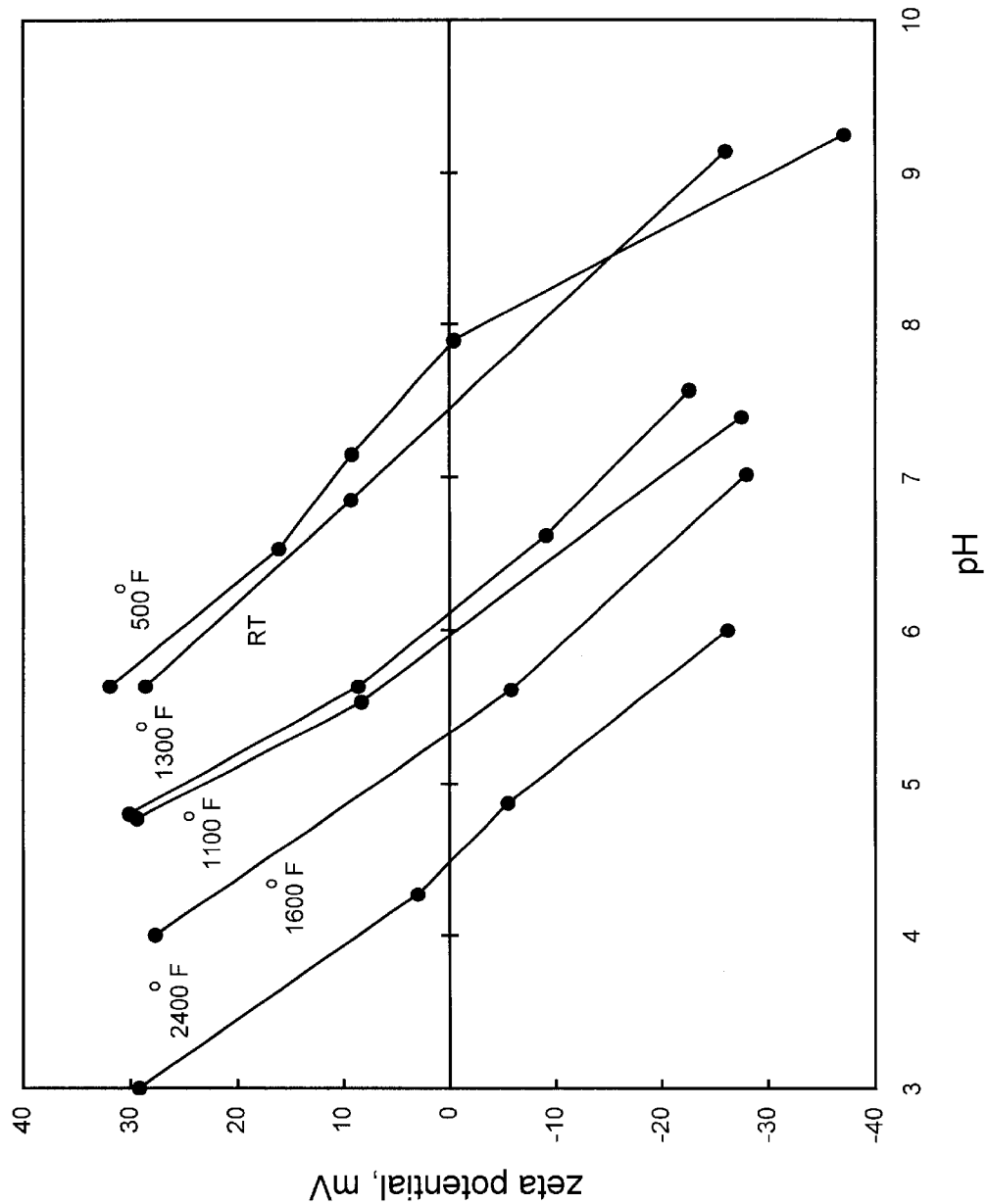
FIG. 1 is a graph of pH versus zeta potential for slurry materials heated at temperatures of from about room temperature to about 2,400° F.

The present invention provides a method for increasing the lifetimes of slurries made from slurry materials, such as refractory powders, by processing materials that have undergone hydration subsequent to commercial production to reduce the amount of hydration before the materials are incorporated into slurries. "Processing" refers to any process whereby the hydration level of a material can be reduced from a first level to a second, lower hydration level, such as heat processing materials, desiccating materials, vacuum or partial vacuum processing materials, and combinations of these methods. As used herein, "increasing the lifetime of a slurry" refers to increasing the lifetime of a slurry made from a processed slurry material, such as a refractory powder, compared to the lifetime of a slurry made from the same slurry material, in the absence of processing. This increase generally is at least 10% and greater, and up to at least 300% and greater, of the lifetime of a slurry made without first processing the slurry material as described herein.

Without limiting the present invention to a theory of operation, based on data presented herein the dissolution rate of slurry material in slurries appears to be related to the extent to which the slurry materials are hydrated at the time they are added to a slurry medium, such as water, an alcohol or alcohols, and combinations thereof. Therefore, if surface hydration can be substantially eliminated from the slurry materials prior to their addition to a slurry mixture, slurry lifetime can be extended. It has been discovered that surprising increases in the lifetime of a slurry can be achieved by a convenient and inexpensive processing, such as heat processing slurry materials that have undergone hydration subsequent to manufacture prior to their addition to a casting slurry mixture.

A. Slurry Materials

All slurry materials that hydrate may be processed according to the method of the present invention to increase the lifetime of slurries made using the processed slurry materials. As used herein, "slurry materials" include metals and/or metalloids, materials comprising metals and/or metalloids, for example, non-refractory materials comprising metals and/or metalloids, refractory metals (e.g., tantalum, tungsten, and rhodium), refractory metalloids, and refractories materials comprising metals and/or metalloids. Slurry materials comprising metals and metalloids include oxides, nitrides, phosphides, sulfides, carbides, fluorides, and oxyfluorides of metals and metalloids, and combinations thereof. Without limitation, particular examples of slurry materials comprising metals and/or metalloids include rare earth metal oxides, for example the oxides of elements 57 to 72 (i.e., the elements lanthanum, cerium, praseodymium, neodymium, promethium, samarium, europium, gadolinium, terbium, dysprosium, holmium, erbium, thulium, ytterbium, lutetium, and hafnium), oxides of the elements vanadium (vanadia), yttrium (yttria), aluminum (alumina), zirconium (zirconia), titanium (titania), silicon (silica), magnesium (magnesia), calcium (calcia), tantalum, tin, gallium, indium, beryllium, thorium, boron, scandium, ruthenium, rhodium, iridium, palladium, platinum, copper, germanium, bismuth, tellurium, neptunium, uranium, plutonium, and combinations of these materials. Silicon nitride and yttrium carbide are also particular examples of slurry materials comprising metals and/or metalloids.

Moreover, the slurry materials used to make the slurry can be processed by other methods designed to increase slurry lifetime, and still benefit by processing according to the method of the present invention. Thus, slurry materials which have been, for example, co-fused or sintered with other slurry materials (e.g., less hygroscopic slurry materials), or which have been doped with other slurry materials, also can be processed according to the method of the present invention to reduce hydration levels to increase slurry lifetime. Examples of co-fused and doped materials are described in U.S. Pat. Nos. 5,407,001 and 5,643,844, which are incorporated herein by reference.

B. Measuring Surface Hydration Levels

The extent of refractory material hydration can be measured by taking zeta potential measurements of a colloidal suspension of refractory powder in deionized water. The zeta potential is the potential across the diffused layer of ions surrounding charged particles in a suspension. Zeta potential measurements are used to determine the magnitude and the sign of the charge on a particle. The pH at which the particle has no net positive or negative charge is called the isoelectric point. The isoelectric point corresponds to the pH at which the zeta potential is zero.

The surface of a slurry material in solution may be negatively or positively charged. The magnitude and the sign of the surface charge will depend on the pH of the solution, ionic strength, and on the particular material selected. For example, at pH values greater than about 8.5, the surfaces of typical refractory materials are negatively charged. When a slurry material is exposed to humidity in the atmosphere a layer of adsorbed water molecules forms on the surface of the material. This process is known as hydration. When slurry materials are exposed to high temperatures water molecules desorb from the surface. This process is known as dehydration. Further ionization of surface hydroxyls produces a surface charge. The density of surface hydroxyl groups on the surface of a particle depends on the chemical nature and the thermal history of the slurry material. Therefore, changes in the isoelectric point of a suspension of slurry material in deionized water reveals changes in the amount of material surface hydration. Generally, a change of about 0.5 pH units in the isoelectric point of a material is sufficient to produce a measurable change in the aging characteristics of a slurry made from that material.

C. Processing Refractory Materials

The following discussion concerns processing refractory materials. It should be understood that such processing can apply to other slurry materials, and is not limited to processing refractory materials.

The lifetime of a slurry can be dramatically increased by processing refractory materials to reduce the hydration level. Any method by which the surface hydration level can be reduced can be used to practice the present invention. This includes use of heat, and/or vacuum or partial vacuum processing of refractory materials, desiccating refractory materials, and combinations of these methods.

Heat processing comprises heating a refractory material at a temperature, and for a period of time, sufficient to decrease the amount of hydration from a first hydration level to a second hydration level. As used herein, "first hydration level" typically refers to the amount of hydration resulting from hydration of the material subsequent to its manufacture by the commercial vendor. Thus, the method is suitable for any refractory material that has undergone hydration or rehydration after manufacture.

The temperature to which a given refractory material should be heated, and the period of time for which the heating should continue, will depend on both the nature of the refractory material and on the desired level of dehydration. Generally, the material should be heated to at least about 100° C. and preferably at least about 260° C. Working embodiments of the present invention typically have heated refractory materials in an oven set at temperatures of from 500° F. (260° C.) to about 2,400° F. (1,320° C.), typically about 1,600° F. (871° C.). Higher temperatures are desirable because they increase the rate and/or the extent of dehydration. The refractory materials typically are cooled to a temperature suitable for handling and slurry formation, such as ambient temperature. Cooling can occur under a water-free environment, or substantially water-free environment, but this is not necessary.

Preferably, both the temperature at which the powder is heated and the duration of the heating period are selected such that the isoelectric point of the slurry material changes. The change in isoelectric point should be at least about 0.5 pH unit or greater, preferably at least 1.0 pH unit or greater, and even more preferably 1.5 pH units or greater as a result of heat processing.

Refractory materials also can be subjected to a vacuum, or at least a partial vacuum, to reduce the hydration level. This process involves placing refractory material in a container having sufficient strength and impermeability to be useful for drying refractory materials under reduced pressure. Again, the refractory material is subjected to the reduced pressure for a sufficient time to reduce the hydration level as measured, for example, by zeta potential.

Refractory materials also may be dried by desiccation, for example by placing refractory materials in an air-tight container along with a dessicant. Examples of dessicants include silica gel, anhydrous magnesium perchlorate, anhydrone, barium oxide, alumina (anhydrous), phosphorus pentoxide, anhydrous lithium perchlorate, anhydrous calcium chloride, ascarite, anhydrous calcium sulfate, sodium hydroxide, anhydrous barium perchlorate, anhydrous calcium oxide, anhydrous magnesium oxide, and potassium hydroxide.

E. Casting Slurry Components

Once the slurry materials are processed as described above, such materials may be incorporated into a casting slurry. A typical casting slurry is composed of three components: (1) a refractory system, (2) a binder system and (3) a solvent system. These three components each may include more than one component. For example, a refractory system may include plural refractory powders having different chemistries and particle sizes. Similarly, a binder system may include a combination of inorganic binders, with or without additional organic binders. Since the late 1940's, when partially hydrolyzed ethyl silicate binder was introduced for investment casting application, silica-based binders have remained a universally favored inorganic binder for investment casting application. A commonly used silica binder is either an aqueous nanometer size, colloidal silica suspension or an ethyl silicate. Besides silica binders, organic emulsion or solution binders also may be used in slurries. The type of binder system dictates the type of solvent system used in a slurry preparation. A mixture of alcohol and low molecular weight organic molecules are commonly used with ethyl silicate. When colloidal silica is used, deionized water typically is used. In order to control surface tension and air bubble formation in aqueous slurries, a minor amount of surfactant and antifoaming agent may be added. Other minor ingredients may also be added at the discretion of the individual foundry.

If the slurry material is not going to be stored in an atmosphere which substantially prevents surface rehydration, then the refractory material, or materials, preferably but not necessarily should be added to the slurry mixture substantially immediately after they have been processed. Adding slurry materials "substantially immediately" means adding them at any time before they rehydrate to the extent that the lifetime of a slurry formed from the heat-processed powders is not increased compared to the lifetime of a slurry formed from the same materials in the absence of heat-treatment. Furthermore, a slurry material has been added to a slurry mixture "substantially immediately" after processing if, at the time of addition, the isoelectric point of the powder has changed, i.e. either increased or decreased, by at least 0.5 pH units as the combined result of the processing and any hydration subsequent to processing. The duration of the time period encompassed by "substantially immediately" will depend on the nature of the slurry material, the extent to which the material underwent dehydration during processing, such as heat-treatment, and the ambient conditions, such as temperature and humidity.

F. Measuring Slurry Lifetime

The increased lifetime of a slurry made with a slurry material or materials processed according to the method of the present invention can be measured in several ways. For example, increased slurry lifetime is evidenced by comparing the time dependence of the concentration of dissolved slurry material in an aqueous suspension made with a processed slurry material to the same suspension made without first processing the slurry material. Over some finite time-scale, the suspension made with the processed slurry material will maintain a lower concentration of dissolved material as a function of time.

Another way to test for increased lifetime is to monitor the time dependence of the size of particle cluster formation in a casting slurry. Similarly, the viscosity of a casting slurry as a function of time may provide information on the useful lifetime of a given slurry.

To further illustrate the heat-processing method, the following examples are provided. These examples are to be considered as exemplary only and in no way limiting the invention to the particular features stated.

EXAMPLE 1

Example 1 describes the process of heat-treating alumina powders. The isoelectric points of the heat-processed powders are compared to the isoelectric point of a non heat-processed alumina powder.

Alumina powder (325 mesh and >99.9% purity) was obtained from Alcoa (Pittsburgh, Pa.). The powder was delivered hydrated in an air/water-permeable container. A control alumina suspension was made by adding 0.01 grams of alumina powder to 400 grams of deionized water with continuous stirring to form a suspension. The pH of the suspension was adjusted by adding 0.01M HCl and 0.01M NaOH. Zeta potential measurements were taken at various solution pHs using a Zetasizer 4 instrument from Malvern (Worcestershire, UK). The results of these measurements are shown in FIG. 1.

Six 30 gram samples of alumina powder were measured out and heated separately in an oven. The samples were heated to 2,400° F., 1,600° F., 1,300° F., 1,100° F. and 500° F. The oven temperatures were maintained for 4 hours. Within 60 minutes of being removed from the oven, 0.01 gram of each sample was added to 400 ml of deionized water and stirred to form a suspension. The pH of each suspension was adjusted by adding 0.01M HCl and 0.01M NaOH. Zeta potential measurements were taken at various solution pHs using a Zetasizer 4 instrument from Malvern.

The zeta potential versus pH curves for the alumina suspensions are shown in FIG. 1. The data show that the isoelectric point of the alumina, within experimental error, generally decreases for powders that are heated to higher temperatures.

EXAMPLE 2

Example 2 describes the process of heat-processing yttria powder. The isoelectric point of the heat-processed powder is compared to the isoelectric point of a non heat-processed yttria powder.

Hydrated yttria powder (325 mesh) was obtained from Treibacher Company (Althofen, Austria). A control yttria suspension was made by adding 0.01 gram of yttria powder to 400 grams of deionized water and stirring to form a suspension. The pH of the suspension was adjusted by adding 0.01M HCl and 0.01M NaOH. Zeta potential measurements were taken at various solution pHs using a Zetasizer 4 instrument from Malvern.

Thirty grams of the yttria powder were placed in an oven and heated to 1,600° F. The powder was maintained at that temperature for four hours. 0.01 gram of yttria was added to 400 grams of deionized water and stirred to form a suspension. The pH of the suspension was adjusted to 11.5 by adding tetraethylammonium hydroxide (TEAOH). The pH was further adjusted by adding 0.01M HCl and 0.1M TEAOH. Zeta potential measurements were taken at various solution pHs using a Zetasizer 4 instrument from Malvern. One set of measurements was taken within 60 minutes of forming the suspension. Another set was taken approximately one day after the formation of the suspension. The final set of measurements was taken 15 days after suspension formation.

Figure 2:
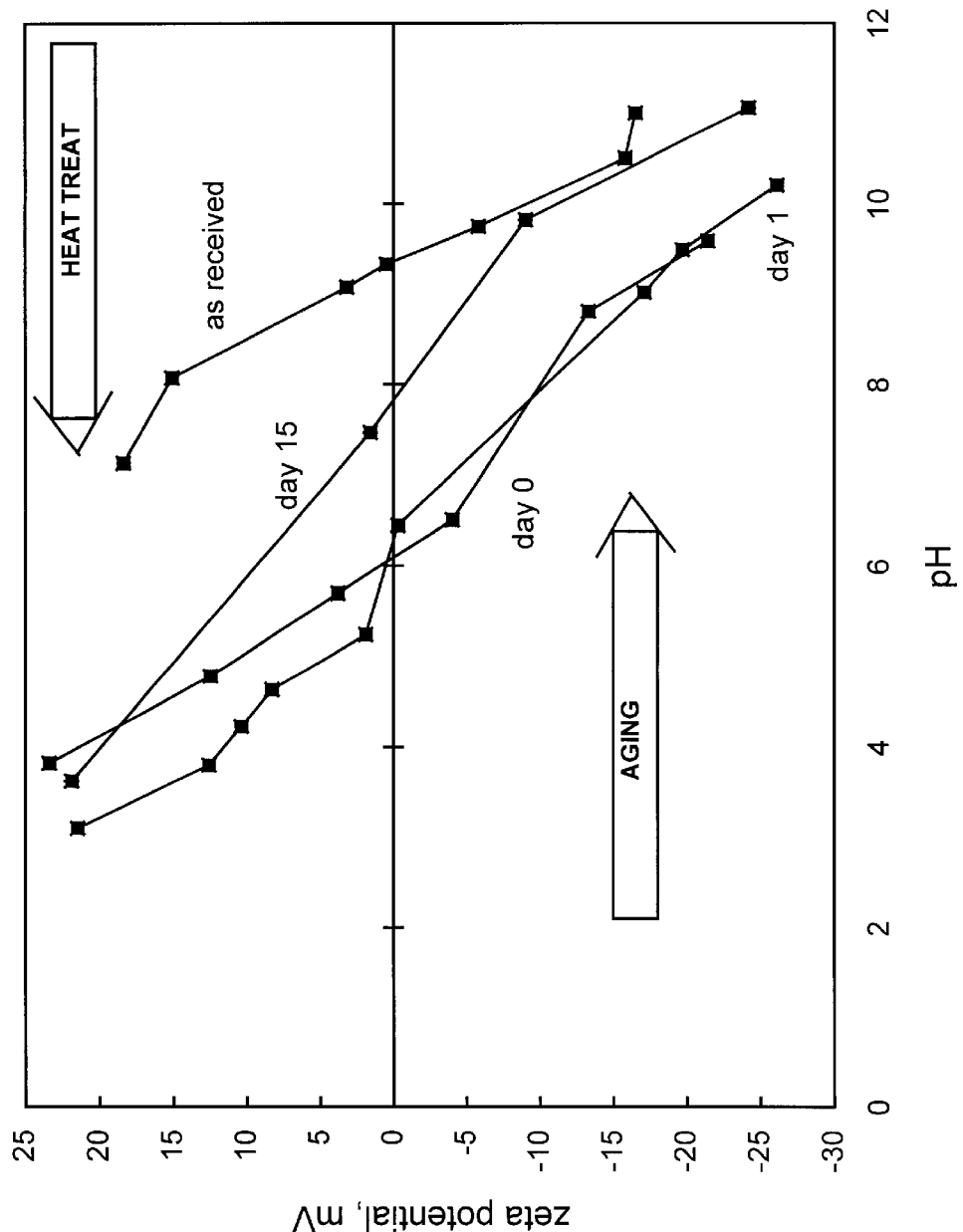
FIG. 2 is a graph of pH versus zeta potential which illustrates changes in zeta potential versus a control over time.

The zeta potential versus pH curves for the yttria suspensions are shown in FIG. 2. The data show that the heat-processed flour has an isoelectric point of about 6 soon after it is added to the deionized water, compared to an isoelectric point of about 9.5 for the non heat-processed powder. The data also show that even after 15 days in solution, the isoelectric point of the heat-processed yttria remains lower than the isoelectric point of non heat-processed yttria.

EXAMPLE 3

Example 3 demonstrates the retardation of alumina dissolution in a aqueous suspension made with powder that has been heat-processed according to the present invention.

Hydrated alumina powder was obtained from Alcoa. A control alumina suspension was made by adding 200 grams of alumina powder to 500 ml of deionized water with stirring to form a suspension. The pH of the control suspension was adjusted to 0.01 using 0.1M HCl.

Two hundred grams of the alumina powder were heated in an oven at 1,600° F. for 4 hours. After cooling, 200 grams of the powder were added to 500 ml of deionized water and stirred to form a suspension. The pH of the suspension was adjusted to 0.01 using 0.1M HCl.

The control suspension and the suspension made from the heat-processed alumina each was placed in a plastic bottle. The bottles were rolled on a roller and 50 ml samples were taken from each bottle periodically. The collected samples were centrifuged for 1 hour at 2,000 rpm. The top half of the supernatant was then drained off and the concentration of dissolved aluminum was measured using inductively coupled plasma tests.

Figure 3:
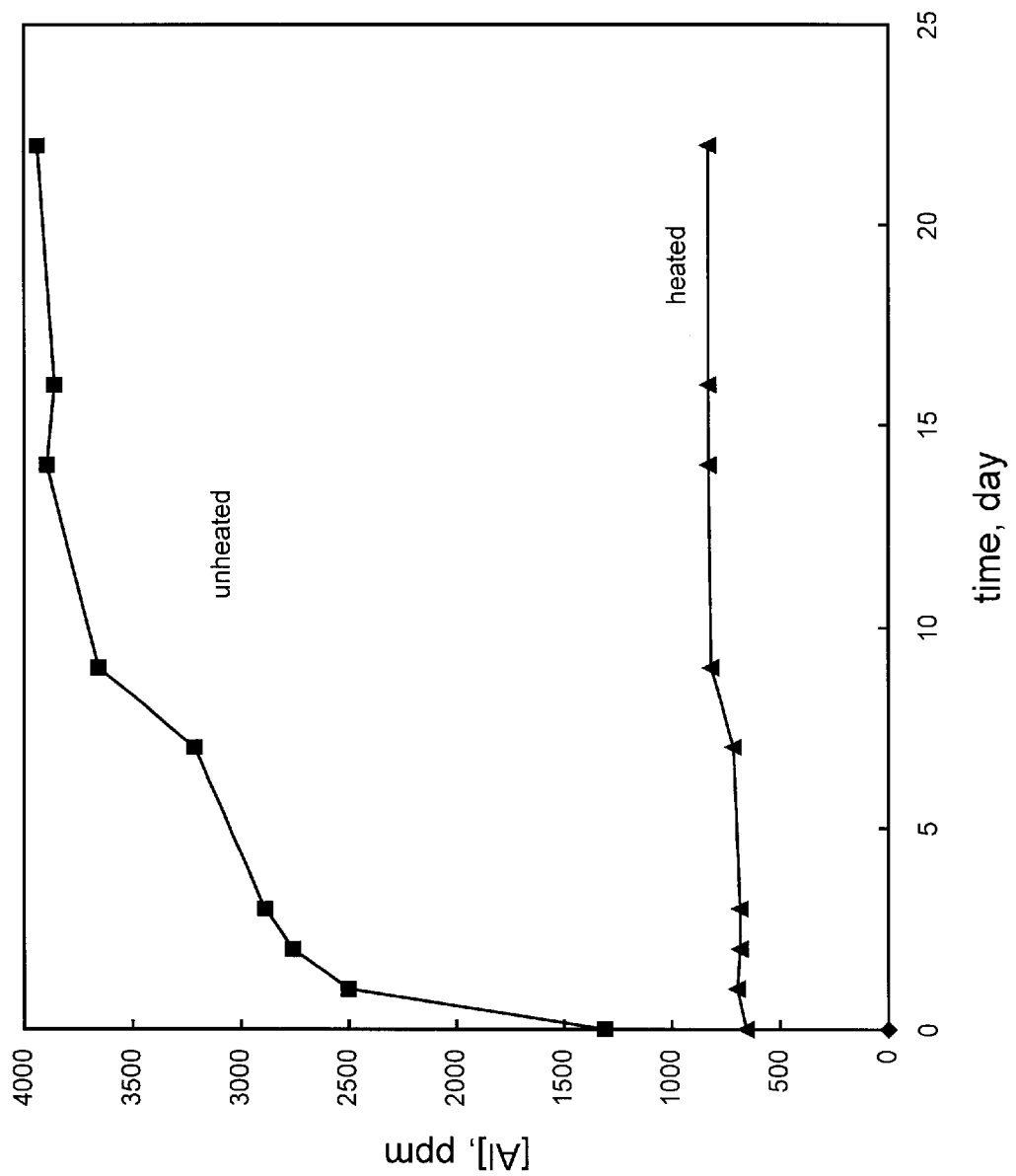
FIG. 3 is a graph of time (days) versus aluminum concentration for alumina slurry materials processed according to the method of the present invention versus a control.
Figure 4:
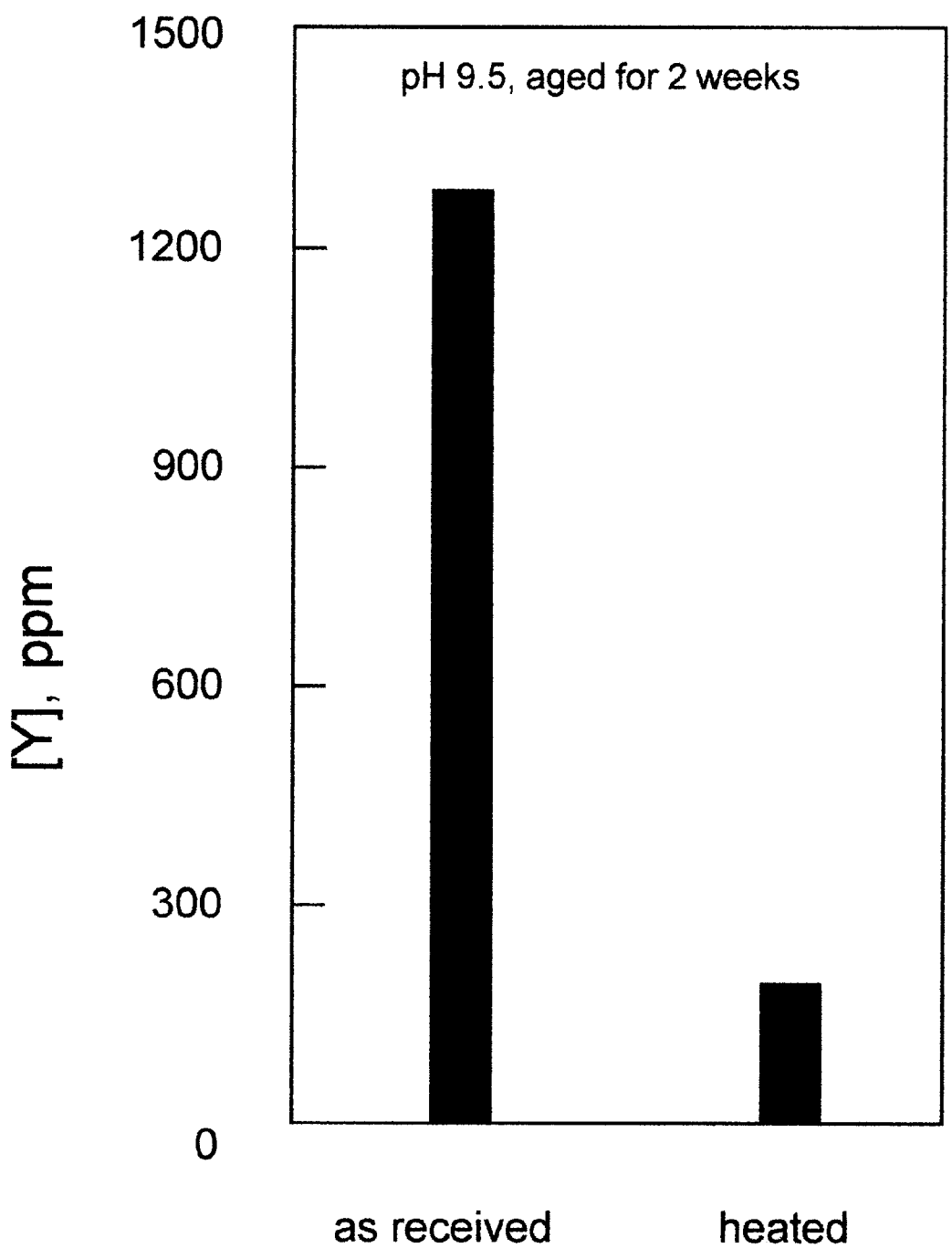
FIG. 4 is a bar graph of yttrium concentration for yttria slurry materials processed according to the method of the present invention versus a control over time.
Figure 5:
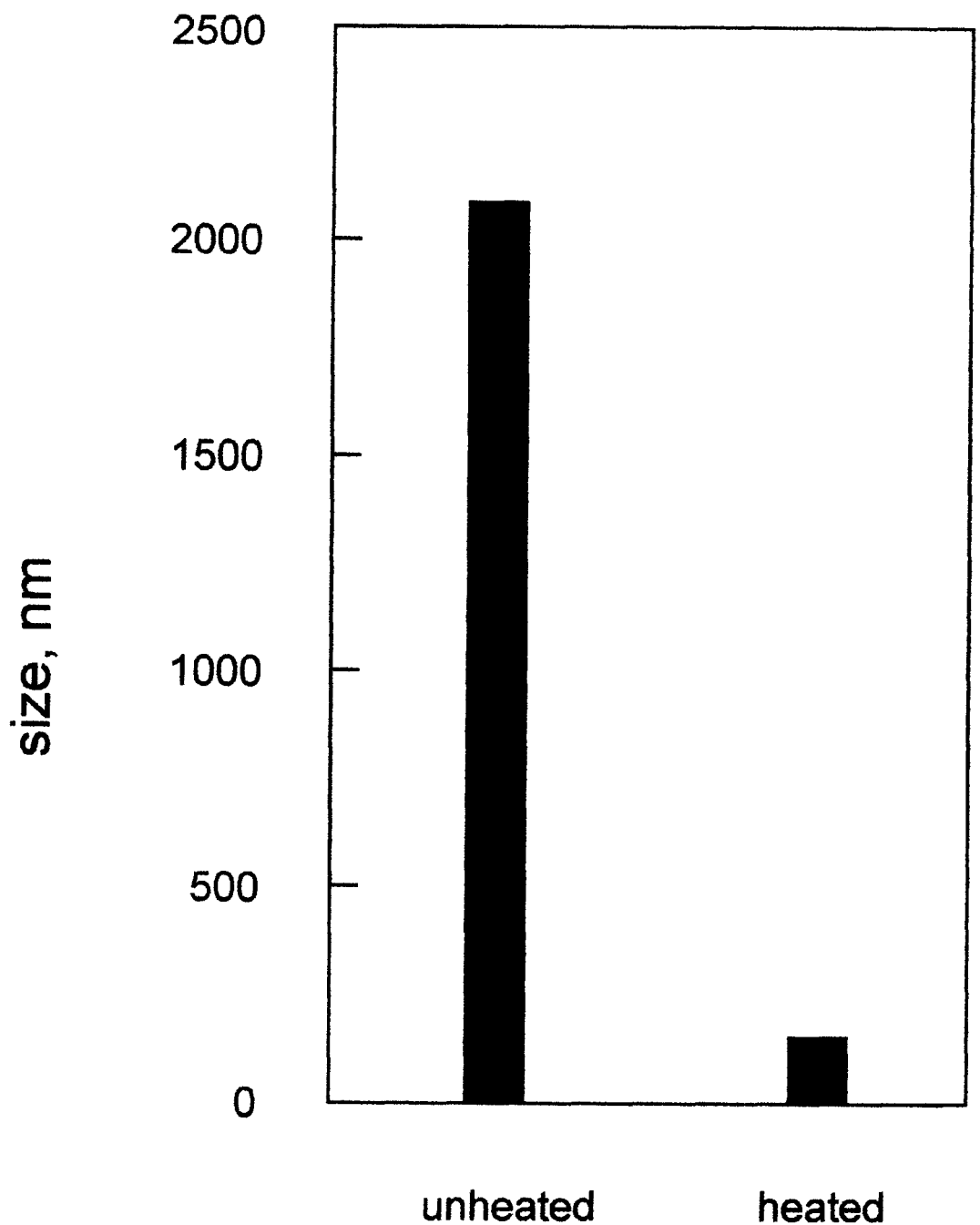
FIG. 5 is a graph illustrating particle size of silica agglomerates processed according to the method of the present invention versus a control.

The dissolved aluminum concentration versus time curves are shown in FIG. 3. These data show that the concentration of dissolved aluminum in the control is substantially higher than in the suspension made with heat-processed powder and that dissolved aluminum concentration in the control is about four times higher after 22 days.

EXAMPLE 4

Example 4 demonstrates the retardation of yttria dissolution in an aqueous suspension made with powder that has been heat-processed according to the present invention.

A control suspension and a test suspension were made according to Example 3, except that hydrated yttria powder, obtained from Treibacher, was used in place of the alumina powder. Both suspensions were placed into bottles that were rolled on a roller for 2 weeks. At the end of two weeks a 50 ml sample of each suspension was removed from each bottle. The collected samples were centrifuged for 1 hour at 2,000 rpm. The top half of the supernatant was then drained off and the concentration of dissolved yttrium was measured using inductively coupled plasma tests. The results of these tests showed that 1,300 ppm yttrium ions had dissolved in the control sample after two weeks while only 200 ppm yttrium ions had dissolved in the sample made from heat-processed yttria powder during the same time period.

EXAMPLE 5

Example 5 describes the formation of an alumina-tetraethylorthosilicate (TEOS) casting slurry according the method of this invention. This example also demonstrates the effectiveness of the heat-processing method at slowing the aging rate of an alumina-TEOS casting slurry.

A control alumina slurry was made as follows. Alumina powder was obtained from Alcoa and added to deionized water with continuous stirring. The powder was added to the deionized water, isopropyl alcohol, TEOS, ethyl alcohol, and dipropyleneglycolmonoethyl ether (DPM). The amounts and weight percentages of each component in the mixture is listed in Table 1.

A second slurry was made as described above with alumina powder that had been heated to 1,600° F. for 4 hours. The weight percentages of each component in the mixture is listed in Table 1.

TABLE 1

| Material | Weight Percent |
| --- | --- |
| Deionized Water | 1.5 |
| TEOS, Silbond | 4.98 |
| Isopropyl Alcohol | 9.23 |
| Ethyl Alcohol | 2 |

TABLE 1-continued

| Material | Weight Percent |
| --- | --- |
| DPM | 0.74 |
| Alumina | 81.55 |

The slurries were placed in separate bottles which were rolled on a roller for 35 days. After 35 days a 50 ml sample was removed from each bottle. The samples were centrifuged for 1 hour at 2,000 rpm. The top half of the supernatants were then collected and the size of the TEOS clusters contained therein were measured by light scattering experiments using a Zetasizer 4 machine from Malvern. The results of these experiments showed that the TEOS clusters in the control grew to 1,787 nm, while those in the slurry made with heat-processed powder grew to only 143 nm in diameter.

The slurry made with the heat-processed powder will have a longer lifetime because aggregate formation, which leads to slurry aging, has been retarded.

EXAMPLE 6

Example 6 describes the formation of a casting slurry according to method of this invention. This example also demonstrates the effectiveness of the heat-treatment method at increasing slurry lifetime by slowing the rate of particle agglomeration in the slurry. The extent of agglomeration was monitored by measuring the viscosity of the slurry. As particle agglomeration increases, the viscosity of the slurry increases.

A control yttria slurry was made as follows. Yttria powder having an average particle size of 15 μm was obtained from Treibacher Company and added to deionized water with continuous stirring, using a high-shear mixer at 3,000 rpm. Latex (Dow 460 NA), surfactant (Aerosol OT), antifoaming agent (Dow Corning 65 Additive), and colloidal silica (Du Pont Ludox SM) were then added to the slurry with continued stirring. The amounts and weight percentages of each component in the mixture is listed in Table 2.

A second slurry was made as described above with yttria powder that had been heated to 1,600° F. for 4 hours. The weight percentages of each component in the mixture are listed in Table 2.

TABLE 2

| Material | Weight Percent |
| --- | --- |
| Deionized Water | 5.1 |
| Latex | 1.9 |
| Surfactant | 0.2 |
| Colloidal Silica | 7.9 |
| Defoamer | 0.1 |
| Yttria | 85 |

Figure 6:
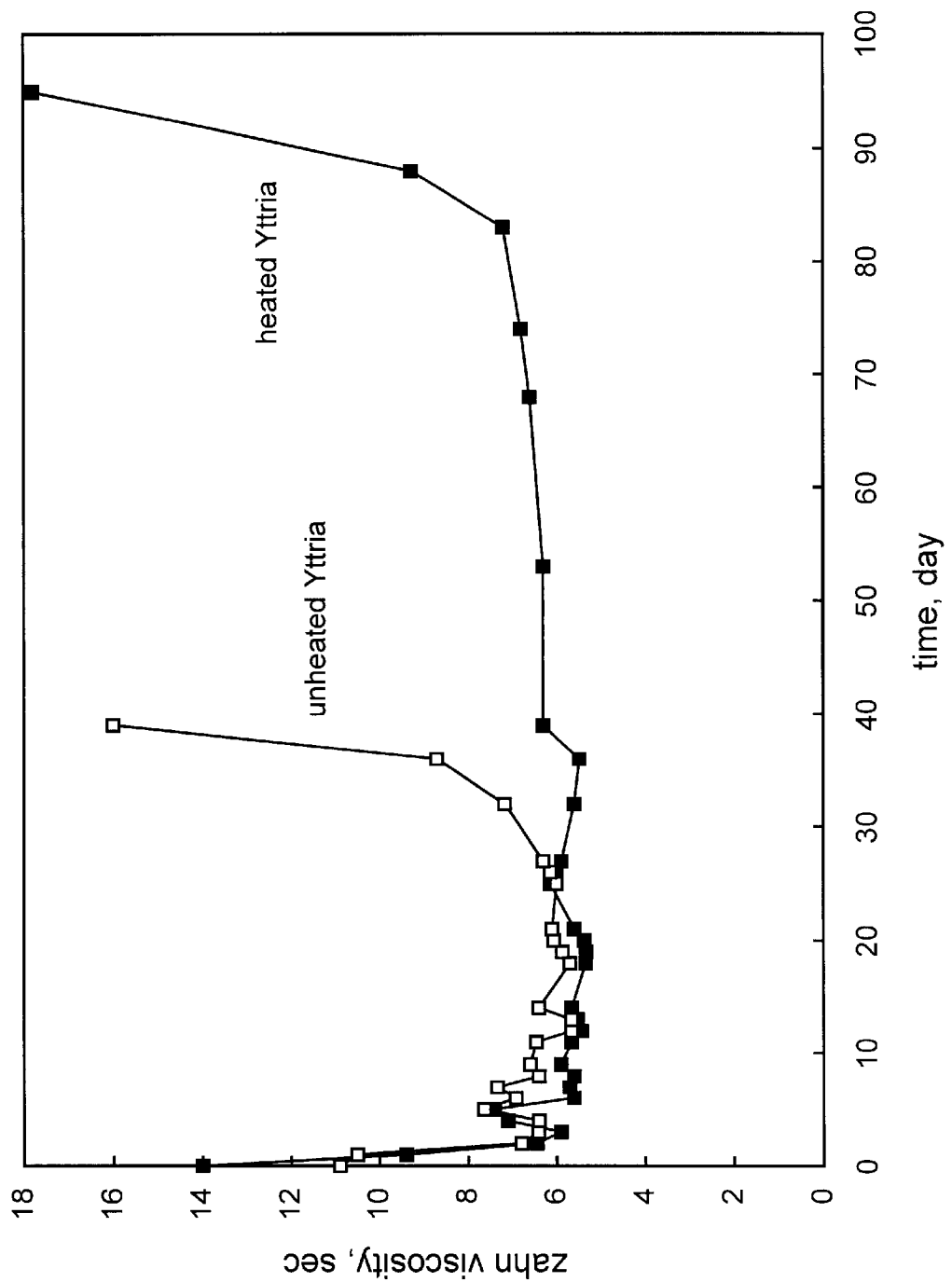
FIG. 6 is a graph of time (days) versus Zahn viscosity for yttria materials processed according to the method of the present invention versus a control.

The viscosity of the slurries was measured periodically using a Zahn viscosity cup #4, made by Gardco Company. The Zahn viscosity versus time curves are shown in FIG. 6. Initially the viscosity of both slurries dropped while inter-particle bonds were broken. Then the slurries stabilized for a period of time during which their viscosities remained relatively constant. As the particles in the slurries began to gel, however, slurry viscosity increased. Once the viscosities have increased sharply, as shown in FIG. 6, the slurries are no longer stable and the useful lifetime of the slurry is over. The results in FIG. 6 show that the slurry made with the heat-processed particles had a lifetime of about 80 days, while the control slurry had a lifetime of only about 30 days.

EXAMPLE 7

Example 7 describes the formation of an alumina-TEOS casting slurry according to the method of this invention. This example also demonstrates the effectiveness of the heat-treatment method at increasing slurry lifetime by slowing the rate of TEOS agglomeration. The extent of agglomeration was monitored by measuring the viscosity of the slurry. As TEOS agglomeration increases, the viscosity of the slurry increases.

Figure 7:
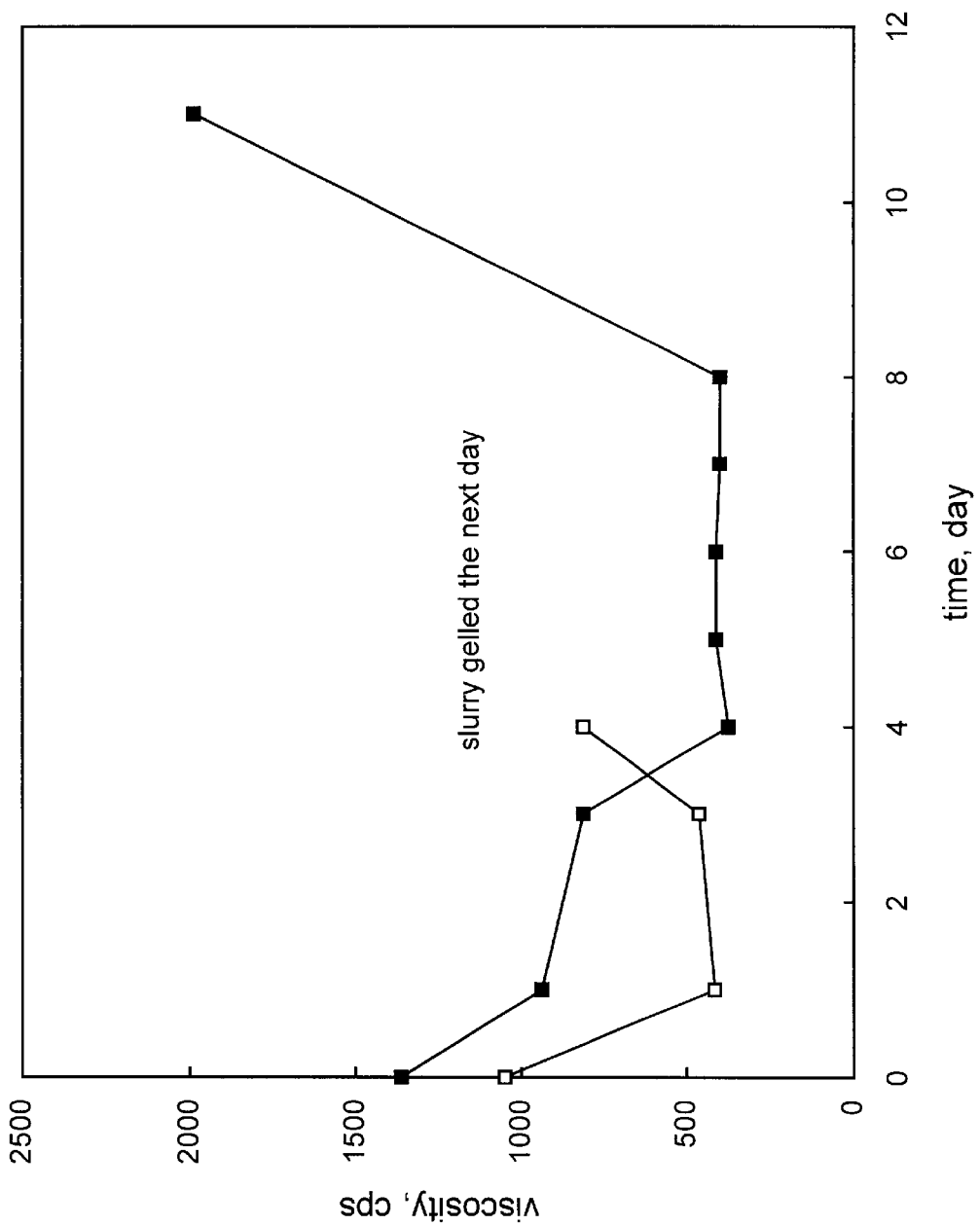
FIG. 7 is a graph of time (days) versus viscosity (cps) for slurries made with materials processed according to the method of the present invention versus a control.

Alumina-TEOS slurries were made according to Example 5. The slurries were placed in an oven at 113° F. and viscosities were measured periodically using a Brookfield tabletop viscometer at 6 rpm. The viscosity versus time curves are shown in FIG. 7. Initially the viscosity of both slurries drops while inter-particle bonds are broken. Then the slurries stabilize for a period of time during which their viscosities remain relatively constant. As the slurries begin to gel, however, slurry viscosity increases. Once the viscosities have increased sharply, as shown in FIG. 7, the slurries are no longer stable and the useful lifetime of the slurry is over. The results in FIG. 7 show that the slurry made with the heat-processed particles have a lifetime of about 8 days, while the control slurry has a lifetime of only about 3 days.

The present invention has been described with reference to several preferred embodiments. Other embodiments of the invention will be apparent to those skilled in the art from a consideration of this specification or practice of the invention disclosed herein. It is intended that the specification and examples contained herein be considered as exemplary only, with the true scope and spirit of the invention being indicated by the following claims.

We claim:

1. A method for increasing the lifetime of a ceramic slurry, comprising:
   providing at least one ceramic material in the form of a powder, the material having undergone hydration subsequent to its manufacture to a first hydration level; and
   processing the ceramic material by heating the at least one ceramic material for a period of time sufficient to reduce the first hydration amount to a second hydration amount; and
   forming a slurry within a time period after heating, the time period being chosen such that the lifetime of the slurry is extended compared to a slurry formed without heating the powder.

2. The method according to claim 1 where heating comprises heating at least one ceramic material for a period of time sufficient to change the isoelectric point of the powder in a slurry medium from an initial pH to a second pH.

3. The method according to claim 2 where the slurry medium is water and the initial and second isoelectric points differ by at least 0.5 pH units.

4. The method according to claim 2 where the initial and second isoelectric points differ by at least 1.5 pH units.

5. The method according to claim 1 where the lifetime of the slurry is at least 10% greater than a lifetime of a slurry formed without heating the powder.

6. The method according to claim 1 where the lifetime of the slurry is at least 200% greater than a lifetime of a slurry formed without heating the powder.

7. The method according to claim 1 where the slurry is an aqueous investment casting slurry.

8. The method according to claim 1 where the slurry is an alcohol-based investment casting slurry.

9. The method according to claim 1 where the ceramic material is selected from the group consisting of yttria, alumina, zirconia, titania, silica, magnesia, calcia, and combinations of these materials.

10. The method according to claim 1 where the ceramic material is yttria.

11. The method according to claim 1 where the ceramic powder is alumina.

12. The method according to claim 1 where heating comprises heating the ceramic material at a temperature of from about 500° F. to about 2,400° F. for a period of time of from about 30 minutes to about 4 hours.

13. The method according to claim 1 where the ceramic material is selected from the group consisting of co-fused materials, doped materials, surface-coated materials, and combinations thereof.

14. The method according to claim 1 where processing comprises processing the ceramic material by vacuum processing.

15. The method according to claim 1 where the ceramic material is used to form the slurry substantially immediately after processing.

16. The method according to claim 1 where processed ceramic material is stored in a substantially water-free environment after processing.

17. The method according to claim 1 where the ceramic material is a material comprising a metal, a metalloid, or combinations thereof.

18. The method according to claim 17 where the ceramic material is selected from the group consisting of oxides, nitrides, phosphides, sulfides, carbides, fluorides, and oxyfluorides of metals and metalloids and combinations thereof.

19. The method according to claim 18 where the ceramic material is selected from the group consisting of oxides of the elements lanthanum, cerium, praseodymium, neodymium, promethium, samarium, europium, gadolinium, terbium, dysprosium, holmium, erbium, thulium, ytterbium, lutetium, hafnium, tantalum, tin, gallium, indium, beryllium, thorium, boron, scandium, ruthenium, rhodium, iridium, palladium, platinum, copper, germanium, bismuth, tellurium, neptunium, uranium, plutonium, vanadium, yttrium, aluminum, zirconium, titanium, silicon, magnesium, calcium, and combinations thereof.

20. The method according to claim 18 where the ceramic material is selected from the group consisting of silicon nitride, yttrium carbide, and combinations thereof.

21. The method according to claim 19 where the ceramic material is selected from the group consisting of yttria, alumina, zirconia, titania, silica, magnesia, calcia, and combinations thereof.

22. The method according to claim 21 where the ceramic material is yttria.

23. The method according to claim 21 where the ceramic material is alumina.

24. The method according to claim 17 where the ceramic material is selected from the group consisting of tantalum, tungsten, rhodium, and combinations thereof.

25. A method for increasing the lifetime of a casting slurry, comprising:
   providing at least one refractory powder selected from the group consisting of materials comprising yttria, zirconia, alumina, and mixtures thereof;
   heating the at least one refractory powder at a temperature of from about 500° F. to about 2,400° F. for a period of time sufficient to reduce a first hydration level of the refractory powder to a second hydration level as measured by a change in isoelectric point of at least 0.5 pH unit from an initial isoelectric point to a second isoelectric point in an aqueous medium; and forming a casting slurry within a time period after heating, the time period being chosen such that the lifetime of the slurry is extended by at least 200% of a lifetime of a slurry formed without heating the powder.

26. The method according to claim 25 where the material has an initial and a second isoelectric point, and where the initial and second isoelectric points differ by at least 1 pH unit.

27. The method according to claim 25 where the initial and second isoelectric points differ by at least 1.5 pH units.

* * * * *